United States Patent [19]

Malcolm

[11] Patent Number: 4,789,949
[45] Date of Patent: Dec. 6, 1988

[54] PRINTER THROUGHPUT

[75] Inventor: Jerry W. Malcolm, Austin, Tex.

[73] Assignee: International Business Machines Corporation, Armonk, N.Y.

[21] Appl. No.: 918,414

[22] Filed: Oct. 14, 1986

[51] Int. Cl.$^4$ ............................................. G06F 3/12
[52] U.S. Cl. .................................. 364/519; 364/523; 400/322
[58] Field of Search ........ 364/523, 519, 200 MS File, 364/900 MS File; 400/322, 121

[56] References Cited

U.S. PATENT DOCUMENTS

| | | |
|---|---|---|
| 3,747,033 | 7/1973 | Boyd . |
| 3,764,994 | 10/1973 | Brooks et al. . |
| 4,158,837 | 6/1979 | Zahorsky ............................ 340/804 |
| 4,334,286 | 6/1982 | Kerigan et al. ...................... 364/900 |
| 4,448,553 | 5/1984 | Yonezawa et al. .................. 400/121 |
| 4,457,229 | 7/1984 | Carrington et al. ............. 101/93.14 |
| 4,458,333 | 7/1984 | Smith .................................... 364/900 |
| 4,651,288 | 3/1987 | Zeising ................................. 364/519 |

Primary Examiner—Gary V. Harkcom
Assistant Examiner—Randy Lacasse
Attorney, Agent, or Firm—J. H. Barksdale, Jr.; H. St. Julian

[57] ABSTRACT

A method of modifying a graphics data stream for improving printer throughput. The data stream is scanned and nulls preceding printable data are converted to text spaces. Text spaces are recognized by the printer to cause a printhead included in the printer to move directly to the first printable data position rather than homing first.

4 Claims, 2 Drawing Sheets

PRINTER THROUGHPUT

DESCRIPTION

CROSS REFERENCE TO RELATED APPLICATION

U.S. patent application Ser. No. 918,413, filed Oct. 14, 1986, entitled "OPTIMIZING PRINTER THROUGHPUT", and having J. W. Malcolm as inventor.

TECHNICAL FIELD

This invention relates generally to printing, and more specifically to improving throughput through data stream modification.

BACKGROUND ART

In the prior art are printing systems which scan a text data stream for the first printable character on a line to be printed. The line to be printed is the current line. When this first character is found, a printer printhead is caused to be moved directly from the last printable character position on the preceding line to the position of the first character on the current line. This movement is without first homing. As such, preceding text spaces for blank space are in effect ignored. U.S. Pat. No. 3,764,994, the IBM Proprinter, and the IBM Personal Computer Graphics Printer are illustrative of the prior art. However, with prior art printers such as the IBM Personal Computer Graphics Printer and the IBM Proprinter, there are no means for distinguishing between nulls and printable data in a graphics data stream for purposes of positioning the printhead. Nulls can be for preceding blank space which may be equivalent to an indent tab on a line. When nulls exist in the data stream, the carrier is caused to return to the first null position which is usually adjacent the left margin.

The invention described herein presents an advance over the prior art in that a graphics data stream following a carrier return and containing preceding nulls is converted or modified in order to be handled in the same manner as a text data stream. This modification includes replacing preceding nulls with spaces. Spaces are recognized by the printing system to cause the head to be moved directly to a position for printing the first printable data. The advantage of this advance is that throughput is significantly increased. This increase is due to the printhead not having to be first homed or moved to the left margin and then escaped to the first print position.

Spaces have been used for padding in the past. In U.S. Pat. No. 3,744,033, tab codes are replaced with spaces for display formatting. However, formatting is not an issue with the instant invention, and the concerns with printing are different than the concerns with displaying.

DISCLOSURE OF THE INVENTION

A unique method of modifying a graphics data stream is provided in order to improve printer throughput. The data stream is altered or modified in that nulls preceding printable data are replaced with text spaces. Text spaces are recognized for causing the printer to perform as though it were printing a text data stream.

BEST MODE FOR CARRYING OUT THE INVENTION

With both the IBM Proprinter and the IBM Personal Computer Graphics Printer, which are matrix printers, text data stream printing is efficiently managed. Spaces preceding and following a line of printable text are in effect ignored for purposes of printhead positioning. This is not the case however, for graphics data streams. For a better understanding of this, reference is first made to FIG. 1.

Figure 1:
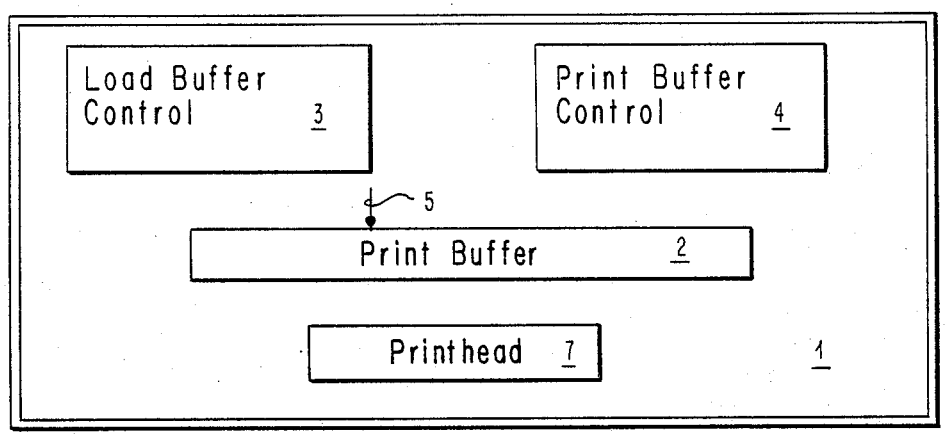
FIG. 1 is a block diagram representation of the pertinent portions of a prior art printing system.

In FIG. 1, a printer system 1 is illustrated. This printer system generally forms part of a standalone, or host-connected, keyboard/display, or device controlled display, computer workstation or system. Printer 1 is made up of a line buffer 2, a control 3 for writing a line of printable data into buffer 2, and a control 4 for controlling a printhead 7 included in printer 1 for printing data. The data written into buffer 2 can be from main memory, etc. included in the workstation. As the illustrated data stream or line is written into buffer 2, a pointer 5 is advanced. When a carrier return code (C/R) is written into buffer 2, control 4 takes control of buffer 2 and causes a printing of the data stream. When printing has progressed up to the C/R, control 3 again takes control of buffer 2.

Figure 2:
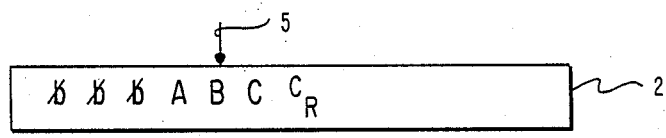
FIG. 2 is an illustration of a line buffer containing a text data stream.

Refer next to FIG. 2. Assume that the line in buffer 2 is the text data shown and contains preceding text spaces. When a C/R is received by control 3, control of the buffer 2 is passed to control 4 for the purpose of printing the contents of buffer 2. Control 4 ignores the leading text spaces for purposes of moving the printhead to print the data. The printhead is directly positioned for printing the "A". This positioning is from the last printable character position on a preceding line. When the character "C" has been printed, the printhead will stop and wait on the next line of data to be loaded into buffer 2. Upon the writing of the C/R for this next line into buffer 2, the printhead will be moved directly for printing the first character.

Figure 3:
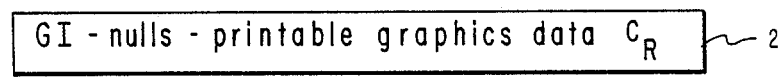
FIG. 3 is an illustration of a line buffer containing a graphics data stream including preceding nulls.

Refer next to FIG. 3. If the data is graphics data, a graphics identifier (GI) will precede the graphics data. Following GI, there are illustrated graphics nulls. The nulls are columns of all zeroes, and as such no actual printing is to take place. Following the nulls is printable graphics data.

With a matrix printer, the printhead can be made up of a vertical column of a plurality of print wires or pins. When one of the wires is activated or fired, a dot will appear on the paper being printed. With the printers mentioned herein, graphics printing is always left to right, while text printing is bi-directional. For graphics, the printhead will be first positioned at the left margin. Thereafter, the nulls will be printed followed by the printable graphics data. In actuality, while reference is made to the nulls being printed, no actual printing takes place. The printhead just moves or escapes across the equivalent print positions on the paper. The time required for this homing and printhead movement is wasted.

Figure 4:
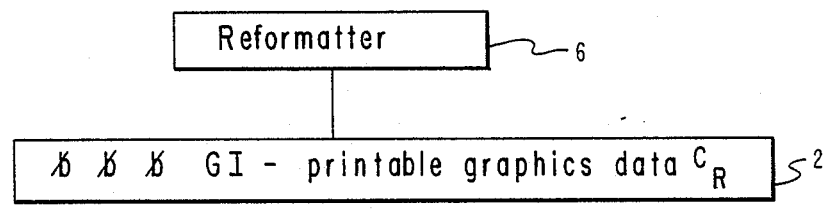
FIG. 4 is a block diagram representation of the structure used for modifying a graphics data stream and sending it to the printing system for printing.

In order to eliminate this wasted time, a reformatter 6 in FIG. 4 is provided to convert the preceding nulls to text spaces as shown. The text spaces are recognized by control 4 to control movement of the printhead directly to the location following the text spaces rather than moving the head to the left margin first.

Set out below is an illustration of a routine or application program useable by a computer system to intercept and reformat a graphics data stream according to this invention. This routine is in programming design language from which both source and machine code are derivable.

```
IF MOST RECENT CHARACTER PRINTED
   WAS CARRIAGE RETURN THEN DO
   SCAN THE BUFFER FROM THE FIRST DATA
      BYTE FOR THE FIRST BYTE THAT IS NOT
      EQUAL TO ZERO
   VARIABLE 'NULS'=(NUMBER OF LEADING
      NULL BYTES)
   DETERMINE THE CURRENT PITCH
   VARIABLE 'CHAR₁₃ WIDTH'=(THE NUMBER
      OF GRAPHICS BYTES REQUIRED FOR
      ONE CHARACTER POSITION FOR THE
      CURRENT PITCH)
   VARIABLE  'LEAD_SPACES'=(NULS)  /
      (CHAR_WIDTH)
   PRINT 'LEAD_SPACES' COUNT OF TEXT
      SPACES
   VARIABLE 'NULS_USED'=(LEAD_SPACES)
      * (CHAR_WIDTH)
   SET BEGINNING POINTER TO GRAPHICS
      DATA AT (ORIGINAL POSITION)+(NUL-
      S_USED)
   SET GRAPHICS DATA COUNT=(ORIGINAL
      COUNT)-(NULS_USED)
ENDIF
PRINT THE BUFFER
```

Figure 5:
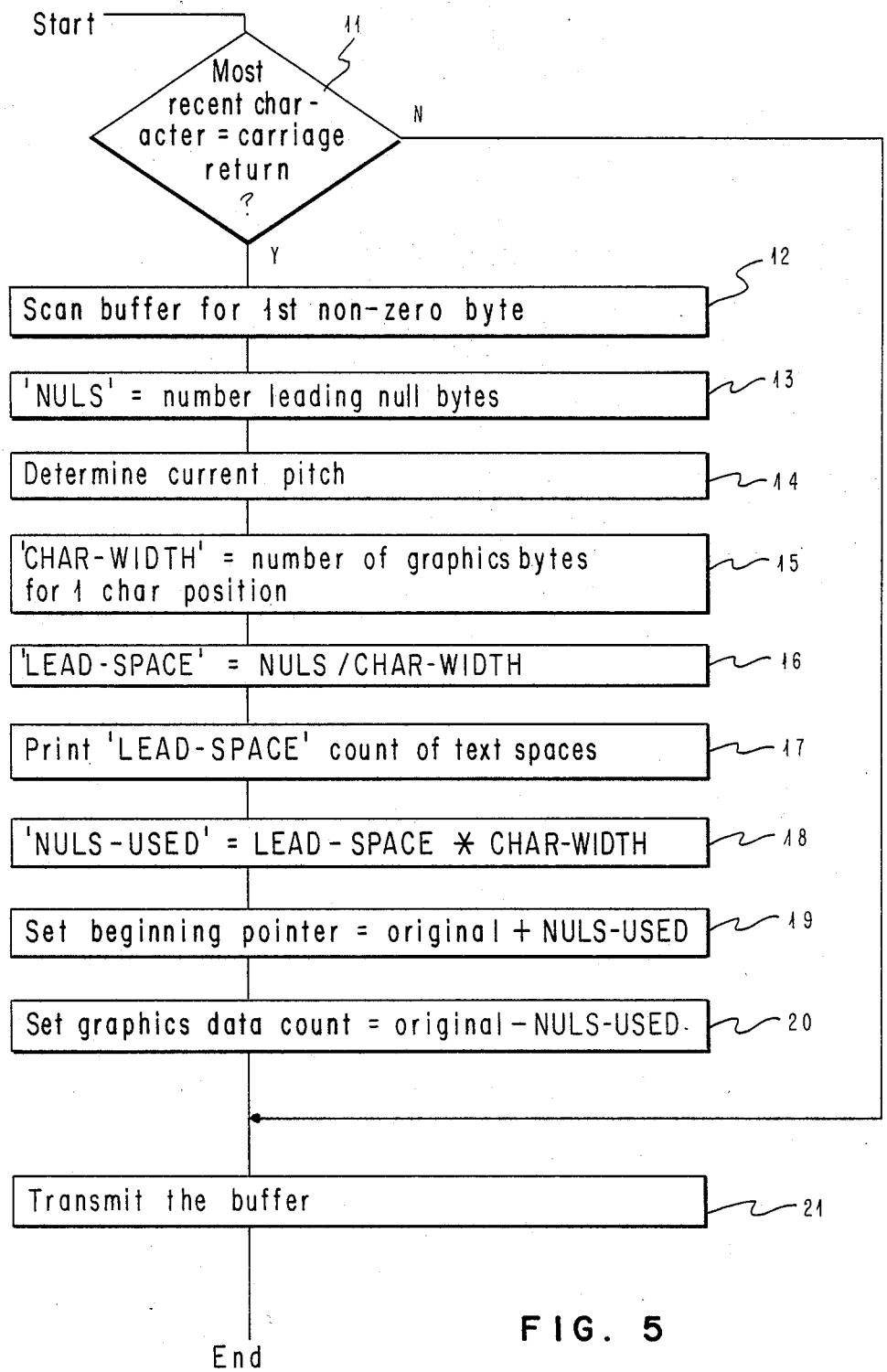
FIG. 5 is a flow chart illustrating the operations performed in converting or modifying a graphics data stream for improving printer throughput.

Refer next to the flow chart in FIG. 5 in conjunction with the above programming design language. Defined are the operations performed by the reformatter to cause the below described conversion and print buffer loading to occur.

The reformatter 6 determines whether the most recent character printed (function executed) was a carriage return (C/R). If the most recent character was not a carrier return as indicated by block 11, then the buffer is printed without change as indicated by block 21.

If the buffer 2 contains data following a carrier return, then the next step is to scan the graphics data stream from the first byte, counting bytes, until the first non-zero (non-null) byte is encountered. This is indicated in block 12.

In block 13, the variable 'NULS' will be used to reference the number of leading bytes that are equal to zero.

The number of graphics nulls required to equal the width of one text space position on the paper being printed is based upon the current pitch of the printer. Pitch is related to the number of characters per inch. For example, if the printer is currently set to operate at 10 pitch printing, then 12 graphics nulls are equivalent in width to one text space. If the printer is currently set to 5 pitch, then 24 graphics nulls are equivalent in width to one text space. As shown in block 14, the reformatter 6 determines the current pitch for the printer. The variable 'CHAR_WIDTH' will be used to reference the number of graphics nulls per text space character position as shown in block 15.

A mathematical calculation is performed to determine the number of text spaces that will be used to replace the graphics nulls. As shown in block 16, the variable 'NULS' is divided by the variable 'CHAR_WIDTH'. The variable 'LEAD_SPACES' will be used to reference the quotient. This variable represents the number of character positions that will fit in the space taken up by the leading graphics nulls.

The reformatter then sends 'LEAD_SPACES' count of text spaces to the printer as indicated in block 17.

Since the number of nulls replaced must be a multiple of CHAR_WIDTH, the reformatter must determine how many leading null bytes to remove from the buffer. This value will differ from the total count of leading nulls by the remainder from the division calculation performed in block 16. Multiply 'LEAD_SPACES' by 'CHAR_WIDTH'. The variable 'NULS_USED' represents the exact number of preceding graphics nulls that have been replaced by the text spaces. This is indicated in block 18.

Next, the reformatter 6 must adjust a beginning buffer pointer to the original position "+NULS_USED", and set the graphics data count to the original "-NULS_USED" as indicated by blocks 19 and 20.

Finally, control 4 causes a printing from the buffer as indicated in block 21.

In summary, a unique method of modifying a graphics data stream is provided in order to improve printer throughput. The data stream is modified in that nulls preceding printable data are replaced with text spaces. Text spaces are recognized for causing the printer to perform as though it were printing a text data stream.

While the invention has been particularly shown and described with reference to a preferred embodiment, it will be understood by those skilled in the art that various changes in form and detail may be made without departing from the spirit and scope of the invention.

I claim:

1. In a printing system where leading nulls in a graphics data stream stored in a print buffer cause homing of a printhead to be directly positioned for printing a following printable character, a method of improving throughput while printing a graphics data stream, said method comprising the steps of:
   scanning said graphic data stream in said print buffer to determine the number of graphic nulls therein;
   determining a pitch under which said printing system is currently printing in order to calculate a character width; and
   causing the printing of a number of text spaces which are equivalent to said number of graphic nulls divided by said character width.

2. The method as recited in claim 1 further includes the step of determining whether a carriage return was the last function executed by said printing system.

3. The method as recited in claim 2 wherein the step of determining the pitch includes the step of determining said characer width by calculating the number of grphic nulls which are equivalent to one text space.

4. The method as recited in claim 3 further includes the steps of:
   determining the number of nulls used by multiplying the equivalent number of text spaces by the character width;
   adjusting the position of a pointer in said print buffer to a position which is equivalent to the number of nulls used; and
   causing the contents of the print buffer beginning with the position of the pointer to be printed.

* * * * *